Jan. 22, 1924.
H. P. KRAFT
WASHER
Filed Dec. 19, 1919
1,481,515
Fig. 1.
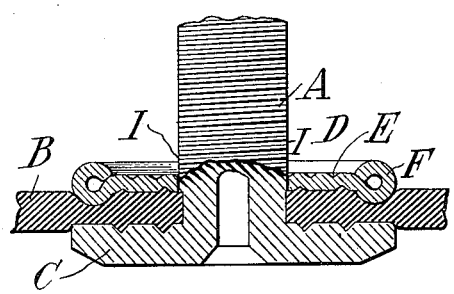
Fig. 2.
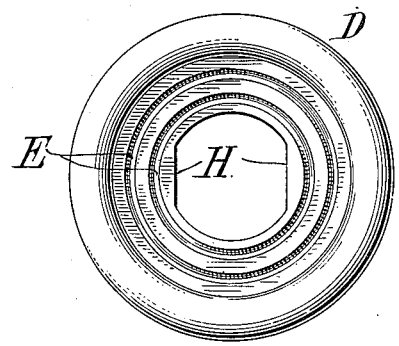
Fig. 3.
INVENTOR:
Henry P. Kraft
By Attorneys, Patented Jan. 22, 1924.

1,481,515

UNITED STATES PATENT OFFICE.

HENRY P. KRAFT, OF RIDGEWOOD, NEW JERSEY.

WASHER.

Application filed December 19, 1919. Serial No. 346,016.

*To all whom it may concern:*

Be it known that I, HENRY P. KRAFT, a citizen of the United States of America, residing in Ridgewood, in the county of Bergen and State of New Jersey, have invented certain new and useful Improvements in Washers, of which the following is a specification.

This invention relates to improvements in washers, and is particularly directed to a novel construction of ring washer for use in pneumatic tire valves.

In the use of large sized tires, particularly large truck tires, it is desirable to form a base on the valve which is of considerably larger dimensions than those in ordinary use in order that the relatively thick inner tube may be adequately clamped to the tire valve casing. It is also desirable to have a correspondingly large ring washer which if made of solid metal is relatively expensive.

According to the present invention, I provide a washer which is particularly adapted for use in this connection, which is made of sheet metal and which is adapted for use either side up, so that in attaching the valves to the tubes it is a matter of indifference which side of the ring washer lies next to the inner tube. Hence the operation of assemblage is facilitated.

In the drawings, wherein I have shown one embodiment of the invention,—

Figure 1 is a diametrical section of the lower part of a valve casing, shown as attached to an inner tube, the ring washer being shown in similar section.

Fig. 2 is a diametrical section of a slightly modified form.

Fig. 3 is a plan of the ring washer.

Referring first to Figs. 1 to 3, let A indicate the casing of a tire valve which is adapted for use in connection with tires of large diameter, such as are used principally in automobile trucks. Such a tire has an excessively thick inner tube which is indicated in the drawing by the reference letter B. In order to adequately clamp the valve casing to such a tube, it is very desirable to have an enlarged foot portion, or base C, and a correspondingly large ring washer D.

According to the present invention I provide a sheet metal ring washer of adequate strength and size, and which is so constructed as to permit its use with either side facing the inner tube; that is to say, both sides of the ring washer are constructed with clamping faces having means for engaging the surface of the inner tube, and adequately holding it against outward strain.

In the construction shown the ring washer is formed of sheet metal which may be corrugated as shown at E. The corrugations may be formed by stamping the metal, or by cutting grooves therein, preferably by stamping. The marginal edge on the ring washer is formed by folding the metal back upon itself, as shown at F. This folding operation is so performed that the inner or web portion G of the ring washer lies between the planes of the upper and lower faces of the ring washer, or in other words, the bead F extends on both sides of the web. The washer is formed with the usual flat portions H which are designed to engage the flats I I of the valve casing.

In Fig. 2 the marginal bead is somewhat flattened, as compared with Figure 1. Otherwise the constructions are identical.

It will be seen that as the ring washer is tightened down on the tube by a nut (not shown), the marginal bead obtains a circular grip upon the tube, while the corrugations or grooves E also obtain a supplemental grip. The connection thus formed between the tube and the tire valve casing is hence a secure and durable one. It will also be seen that either side of the ring washer may be placed against the inner tube, so that during assembly the workman does not have to pay any attention to the position of the ring washer when it is slipped over the valve casing.

While I have shown and described several forms of the invention, it will be understood that I do not wish to be limited thereto, since various changes can be made therein without departing from the spirit of the invention.

What I claim is:—

1. A washer having a central web portion and a marginal beaded portion extending on each side beyond the web portion.

2. A washer formed of sheet metal and having a marginal beaded portion formed by folding the edge of the metal, and a web portion lying in a plane intermediate of those of the faces of the beaded portion.

3. A washer having a central web portion and a marginal beaded portion extending on each side beyond the web portion, the web portion being corrugated.

4. A washer formed of sheet metal having a web portion formed with bent-up corrugations, and a marginal beaded portion surrounding the web portion and extending on each side beyond the plane of the latter, said beaded portion being formed by folding the marginal edge of the metal.

5. A washer formed of sheet metal and having its periphery turned to form a peripheral bead.

In witness whereof, I have hereunto signed my name.

HENRY P. KRAFT.